(12) United States Patent
Vilkman et al.

(10) Patent No.: US 7,148,281 B2
(45) Date of Patent: Dec. 12, 2006

(54) POLYMER BLEND AND METHOD OF PREPARING SAME

(75) Inventors: Taisto Vilkman, Tuusula (FI); Jenni Mustonen, Tampere (FI); Hannu Minkkinen, Länsi-Teisko (FI); Mikko Karttunen, Tampere (FI)

(73) Assignee: Premix Oy, Rajamaki (FI)

( * ) Notice: Subject to any disclaimer, the term of this patent is extended or adjusted under 35 U.S.C. 154(b) by 280 days.

(21) Appl. No.: 10/678,073

(22) Filed: Oct. 6, 2003

(65) Prior Publication Data

US 2005/0261411 A1 Nov. 24, 2005

Related U.S. Application Data

(63) Continuation of application No. PCT/FI02/00286, filed on Apr. 3, 2002.

(30) Foreign Application Priority Data

Apr. 4, 2001 (FI) ................... 20010707

(51) Int. Cl.
*C08K 3/08* (2006.01)
*C08K 3/22* (2006.01)

(52) U.S. Cl. ............ 524/440; 524/430; 524/431; 524/432; 524/433; 524/434; 524/435; 524/436; 524/437; 524/438; 524/439; 524/441; 252/511; 252/512; 252/513

(58) Field of Classification Search ........ 524/430–441; 252/511–513
See application file for complete search history.

(56) References Cited

U.S. PATENT DOCUMENTS

| | | | |
|---|---|---|---|
| 4,088,626 A | 5/1978 | Gergen et al. | |
| 4,465,804 A | 8/1984 | Sorensen | |
| 4,929,388 A | 5/1990 | Wessling | |
| 5,213,736 A | 5/1993 | Sumita et al. | |
| 5,225,471 A | 7/1993 | Tajima et al. | |
| 5,844,037 A | 12/1998 | Lundgard et al. | |
| 6,638,448 B1 * | 10/2003 | Karttunen et al. | 252/512 |
| 6,814,890 B1 * | 11/2004 | Tamawskyj et al. | 252/511 |
| 2002/0043654 A1 | 4/2002 | Karttunen et al. | |

FOREIGN PATENT DOCUMENTS

| | | |
|---|---|---|
| DE | 2 435 418 | 2/1975 |
| EP | 0 181 587 | 5/1986 |
| EP | 0 272 541 | 6/1988 |
| EP | 0 581 541 | 2/1994 |
| EP | 0 718 350 | 6/1996 |
| EP | 0 971 366 | 1/2000 |
| FI | 991372 | 3/1999 |
| GB | 1 457 157 | 12/1976 |
| JP | 59-223313 | * 12/1984 |
| RU | 2 032 948 | 4/1995 |
| RU | 2032948 | * 4/1995 |
| WO | WO 99/41304 | 8/1999 |

* cited by examiner

*Primary Examiner*—Peter Szekely
(74) *Attorney, Agent, or Firm*—Young & Thompson

(57) ABSTRACT

A method of preparing an electrically conductive polymer blend, and an electrically conductive polymer blend includes steps of selecting at least two polymeric materials that are substantially immiscible together, mixing the polymeric materials into a blend so that at least one of the polymeric materials forms a continuous three-dimensional phase through the entire blend, and mixing an electrically conductive filler into the blend. The difference in surface tension between the polymeric material forming the continuous three-dimensional phase and the other polymeric materials forming the blend is at least 2 mN/m.

5 Claims, 1 Drawing Sheet

POLYMER BLEND AND METHOD OF PREPARING SAME

Figure 1:
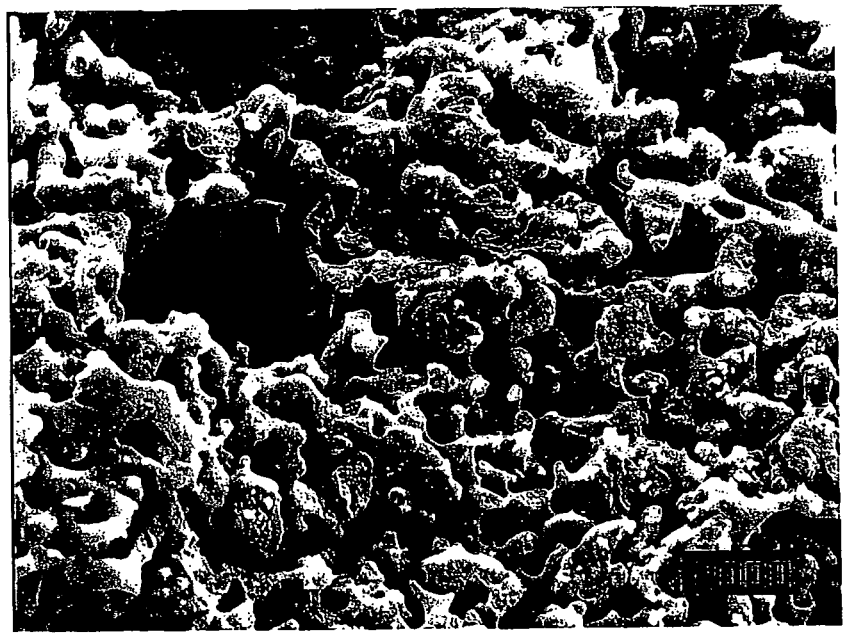

This application is a Continuation of International Application PCT/FI02/00286 filed on Apr. 3, 2002, which designated the U.S. and was published under PCT Article 21(2) in English.

The invention relates to a method of preparing an electrically conductive polymer blend, the method comprising steps of selecting at least two polymeric materials that are substantially immiscible together, mixing said polymeric materials into a blend so that at least one of the polymeric materials forms a continuous three-dimensional phase through the entire blend, and mixing an electrically conductive filler into said blend.

The invention further relates to an electrically conductive polymer blend.

With respect to their electrical properties, polymers and polymer blends are usually insulating materials. However, for some applications it is advantageous for a polymeric material to have some degree of electrical conductivity. Such applications include housings for electronic appliances, antistatic packages, containers and pipelines for flammable materials, objects to be painted electrostatically, and several other applications known per se. It should be noted that in the present application the expression 'polymeric material' refers to a material based on a blend of one or more polymers and additives, where the polymers are in a continuous phase that determines the nature of the material.

The prior art teaches preparation of electrically conductive polymer blends by blending, i.e. filling the polymeric material with electrically conductive additives or fillers. Conductive fillers used most often include electrically conductive soot, carbon fibre, metal powders and fibres, and different particles and fibres coated with electrically conductive material.

The filled material is conductive if the electrically conductive particles in the filler are in contact with one another, or if the distance between the particles is very small, so that a conductive chain extends through the material. If the particles are evenly distributed in the material, they must have a relatively large volume fraction in order to form an electrically conductive structure. However, a large volume fraction of a filler in a plastic matrix formed of the polymeric material usually deteriorates significantly e.g. the mechanical properties, processability or surface quality of the material. Furthermore, the price of the material increases considerably.

There have been efforts to reduce the filler content required for electric conductivity in various manners, e.g. by means of fibrous conductive fillers and conductive fillers with extremely small particles. For example fibrous conductive particles provide conductivity at lower concentrations than spherical particles. Furthermore, fibrous materials often reinforce the matrix. A drawback is the fibre orientation and cracking in melt processing, and a higher price, which substantially restrict the use of fibres. When processed suitably, fillers with minuscule particles, such as soot and carbon black, often form chains of several particles, where a sufficient level of conductivity is obtained at rather low concentrations. Dispersion of fillers with small particles in molten plastic requires high shearing forces in melt mixing, which can damage the plastic matrix. On the other hand, insufficient melt mixing leads to poor dispersion, which deteriorates the mechanical properties and electric conductivity of the material. A fine filler also significantly increases the melt viscosity of the plastic, thus deteriorating the processability thereof. The processing conditions also affect the conductivity of particles.

The required amount of filler can also be reduced by forming a plastic matrix of two or more polymeric materials, which constitute at least two separate phases, and the conductive filler is dispersed mainly in some, preferably one, of the phases. In order that such a blend could be electrically conductive, at least the phase with the conductive filler should be continuous. Furthermore, at least one other phase must be continuous to obtain good mechanical properties and/or processing properties. In other words, at least two polymeric materials must form a continuous three-dimensional phase, and the filler must be mainly dispersed in only one of the phases. Such structures are disclosed e.g. in U.S. Pat. No. 5,844,037, WO Publication 9,941,304, and in European Patent Applications 0,272,541, 0,718,350 and 0,581,541, which do not disclose, however, an accurate method of preparing an electrically conductive polymer blend. The references do not substantiate the occurrence of a two-phase structure, nor do they explain the distribution of the electrically conductive filler mainly into only one phase of polymeric material.

An objective of the present invention is to provide a method of preparing an electrically conductive polymer blend, and a polymer blend avoiding the aforementioned drawbacks.

A method according to the invention for preparing an electrically conductive polymer blend is characterized in that the electrically conductive filler contains a metal, and that the difference in surface tension between the polymeric material forming the continuous three-dimensional phase and the other polymeric materials forming the polymer blend is at least 2 mN/m.

Furthermore, an electrically conductive polymer blend according to the invention is characterized in that the polymer blend is prepared by the method according to claim 1.

According to a basic idea of the invention, at least one of the polymeric materials to be mixed together forms a continuous three-dimensional phase in the polymer blend, and the difference in surface tension between the polymeric material forming the continuous phase and the other mixed polymeric materials is at least 2 mN/m measured with the same method. Furthermore, the idea of a preferred embodiment of the invention is that the surface tension of the polymeric material forming the continuous three-dimensional phase is at least 2 mN/m higher than the surface tension of the other polymeric materials forming the blend, and that the electrically conductive filler has higher surface tension than the polymeric materials forming the polymer blend. Moreover, the idea of another preferred embodiment of the invention is that the surface tension of the polymeric material forming the continuous three-dimensional phase is at least 2 mN/m lower than the surface tension of the other polymeric materials forming the polymer blend, and that the electrically conductive filler has lower surface tension than the polymeric materials forming the polymer blend. Further, the idea of a third preferred embodiment of the invention is that the polymer blend comprises at least two three-dimensional continuous phases.

An advantage of the invention is that it provides a very clear and simple method of preparing matrix combinations of conductive polymer blends. Compared to a single-phase structure, the invention provides sufficient electrical conductivity with a very small volume fraction of an electrically conductive filler, since the conductive filler is dispersed in a relatively small part of the matrix volume, i.e. mainly in only one polymeric material phase, instead of being distributed homogenously into the matrix material of the entire blend. The polymer blend can be processed in several manners with processing equipment and methods used generally in the plastics industry, such as injection moulding, extrusion, thermoforming or the like. Despite good electrical conductivity, the blend according to the invention has a low melt viscosity, wherefore it can be used to manufacture high-quality products of demanding shapes.

Figure 2:
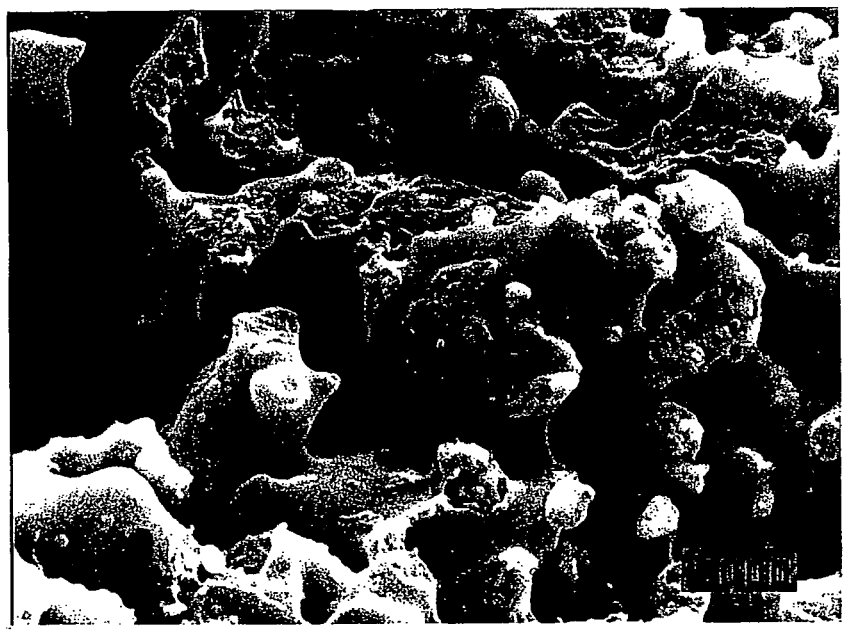

The invention will be described in more detail in the accompanying working examples and in the drawings, in which FIGS. 1 and 2 show microscopic images of a blend according to the invention.

EXAMPLE 1

A pair of selected polymeric materials A and B, shown in Table 1, was mixed with a volume ratio of 1:1. The criterion in the selection of polymeric material pairs was that the melt viscosities should be as close to one another as possible within a range of shear rates between 100 and 1000 1/s. An objective was a viscosity ratio of about 1:2 to 1:0.5, since the blend was to comprise two continuous polymeric material phases. The viscosity ratio of the blends was estimated from viscosity-shear rate curves provided by the manufacturers. The blends were made with mixer head W50E of Brabender torque rheometer. Nickel particles were added to the melt plastic blend, such that the amount of nickel in the final composition was about 50% by weight, i.e. about 11 to 12% by volume, depending on the density of the matrix polymeric materials. The nickel used was INCO 210 with a particle size of about 0.5 to 1 μm. After mixing for about five minutes, the rheometer was stopped and the blend was scraped into an aluminium mould, where it was allowed to cool. The cooled mass was granulated by Rapid granulator, a suitable amount of the granulated mass was measured into the mould and pressed in a heatable press into sheets, which were cooled in the closed press. Both mixing and pressing were carried out utilizing the lowest possible processing temperature of that plastic of the blend which is to be processed at a higher temperature. Table 1 shows resistivities measured from a compression-moulded sample with a two-point method, when the voltage of measurement was 1V and the distance between sensors was 53 mm.

TABLE 1

| No | Phase A (higher surface tension) | Phase B (lower surface tension) | Difference in surface tension [mN/m] | Resistivity [ohm · cm] | Viscosity ratio (A:B) |
|---|---|---|---|---|---|
| 1 | PBT | PA6 | 14 | 0.018 | 1.8:1 |
| 2 | PA66 | PA6 | 6–8 | 0.044 | 1.8:1 |
| 3 | PBT | PMMA | 6.7 | 0.006 | 0.8:1 |
| 4 | PBT | PC | 4.9 | 2 | 0.5:1 |
| 5 | PBT | SAN | 4.8–6 | 0.019 | 2.8:1 |
| 6 | PA66 | PMMA | 5.4 | 0.063 | 0.6:1 |
| 7 | PA66 | PC | 3.6 | 0.180 | 0.4:1 |
| 8 | PMMA | PA6 | 2.7 | 0.007 | 3.5:1 |
| 9 | PC | PMMA | 1.8 | >1 × 10$^{10}$ | 0.75:1 |
| 10 | SAN | PC | 0.1–1.8 | >1 × 10$^{10}$ | 0.4:1 |
| 11 | SAN | PMMA | 0–1.9 | >1 × 10$^{10}$ | 0.4:1 |

The abbreviations for the polymers are as follows: PBT=polybutylene terephthalate, PA6=polyamide 6, PA66=polyamide 66, PMMA=polymethyl-methacrylate, PC=polycarbonate, SAN=styrene/acrylonitrile copolymer, and ABS=acrylonitrile/butadiene/styrene copolymer. The surface tension values are primarily tabular values from the "Polymer Handbook".

FIGS. 1 and 2 show microscopic images of granulated material formed of blend number 3 shown in Table 1. The matrix PMMA has been dissolved with ethyl acetate to provide an electrically conductive continuous PBT phase. The image of FIG. 1 is enlarged 2000 times and the image of FIG. 2 is enlarged 2500 times. As seen from the figures, the electrically conductive continuous phase forms a net-like three-dimensional close-textured structure that extends through the entire volume of the blend.

An electrically conductive filler particle has preferably a size of less than 5 μm. The filler particles thus fit well inside the conductive phase. The particle size is preferably less than 500 nm in blends that are intended for use especially in treatment processes where the blend is subjected to high shear rates.

EXAMPLE 2

The polymeric material pairs disclosed in Example 1 were mixed at a volume ratio of about 1:1 in 25 mm twin screw Berstorff compounder. The premixed blend was fed into the feeding zone of the compounder screw, and powdery nickel was supplied to the molten plastic by a gravimetric feeder. In this example, too, the amount of nickel in the final blend was about 50% by weight, i.e. about 11 to 12% by volume, depending on the density of the matrix polymeric materials. The blend was granulated, dried and injection-moulded with Engel 200/50 HL into a test bar mould dimensioned according to ISO 3167. Since compression-moulded samples generally provide better conductivity values than injection-moulded samples, only one batch of blends (no 11) was made for injection moulding tests from blends that are non-conductive after compression moulding.

Table 2 shows resistivities measured from an injection-moulded sample. The table shows the best value of characteristic resistivity measured with either a two-point or a four-point method from test bars injected at different rates.

TABLE 2

| Blend No | Phase A (higher surface tension) | Phase B (lower surface tension) | Difference in surface tension [mN/m] | Resistivity [ohm · cm] | Viscosity ratio (A:B) |
|---|---|---|---|---|---|
| 1 | PBT | PA6 | 14 | 0.4 | 1.8:1 |
| 2 | PA66 | PA6 | 6–8 | 1.5 | 1.8:1 |
| 3 | PBT | PMMA | 6.7 | 0.7 | 0.8:1 |
| 5 | PBT | SAN | 4.8–6 | 13 | 2.8:1 |
| 6 | PA66 | PMMA | 5.4 | 0.4 | 0.6:1 |
| 7 | PA66 | PC | 3.6 | 15 | 0.4:1 |
| 8 | PMMA | PA6 | 2.7 | 0.7 | 3.5:1 |
| 11 | SAN | PMMA | 0–1.9 | >1 × 10$^{10}$ | 0.4:1 |

The measurement results for resistivity indicated in Tables 1 and 2 unexpectedly show that when the difference in the surface tension between the polymeric materials of the pair is about 2 mN/m or more, as with blends 1 to 8, the blend has such a low resistivity that it is conductive. On the other hand, when the difference in the surface tension is lower, as with blends 9 to 11, the blend is not electrically conductive. The essential difference in the electrical conductivity can be explained as follows: since metal particles are known to have higher surface tension than polymeric materials, a nickel particle is mainly dispersed in the phase with higher surface tension. When the difference in surface tension between the phases is about 2 mN/m or more, such a high proportion of nickel particles is dispersed in phase A that the particles form electrically conductive paths extending through the entire phase. In blends 9 to 11, the difference in the surface tension between the phases is so small that substantial amounts of conductive particles are dispersed in each phase. In such a case the density of the electrically conductive particles in each phase is too low to form conductive paths that would extend through the entire phase. Naturally the phase combinations of blends 9 to 11 can also be made electrically conductive by substantially increasing the amount of the conductive filler, but as it has already been noted above, a high volume fraction of filler in the plastic matrix usually deteriorates significantly the mechanical properties and processability of the blend and increases the price thereof.

The proportion of the volume ratio of the polymeric materials to the melt viscosity ratio thereof follows a formula $$V_1/V_2 = K \cdot \eta_1/\eta_2 \quad \text{(equation 1)}$$

where $V_1$=combined volume fraction of polymeric material 1 and a conductive filler of the volume of the entire blend, $V_2$=volume fraction of polymeric material 2 of the volume of the entire blend, K=factor with a value in the range $0.3 \leq K \leq 3$, $\eta_1$=viscosity of polymeric material 1, and $\eta_2$=viscosity of polymeric material 2 at a shear rate range of between 100 and 1000 1/s measured with the same method. When the volume fractions and the viscosities are measured, the effect of the filler on the plastic properties is taken into account. The disclosed viscosity ratio enables the formation of two continuous three-dimensional phase structures in the blend. Most of the electrically conductive filler is dispersed in one of the continuous phases, and the other continuous phase improves the mechanical and processing properties of the blend. The materials set forth in Tables 1 and 2 provide factor K with values between 0.3 and 2.7 at viscosity ratios of $\eta_1:\eta_2$=0.4:1 to 3.5:1, when $V_1$=0.56 (0.44 volume fractions of polymer+0.12 parts by volume of nickel) and $V_2$=0.44.

EXAMPLE 3

Blends were prepared as disclosed in Example 1, but at volume ratios that were different from the volume ratio 1:1 used in Example 1. The proportion of nickel powder from the total volume decreased, since the volume fraction of the dispersing phase A diminished, and the proportion of nickel from the dispersing phase was still about 22% by volume. Table 3 shows resistivities measured from compression-moulded samples.

TABLE 3

| Phase A | Phase B | Polymer volume ratio | Viscosity ratio | Ni % by volume | Phase volume ratio | Resistivity [ohm · cm] |
|---|---|---|---|---|---|---|
| PBT | PMMA | 1:2.6 | 1:1.5 | 7.4 | 1:2 | 0.179 |
| PBT | PMMA | 1:2.6 | 1:2.4 | 7.4 | 1:2 | 0.031 |
| PA6.6 | PC | 1:2.3 | 1:1.2 | 7.6 | 1:1.8 | 0.6 |

The value of factor K with the materials shown in Table 3 was between 0.8 and 1.5. As seen from Table 3, very low resistivity values were obtained.

The examples and the related description are only intended to illustrate the inventive idea. The details of the invention can vary within the scope of the claims. Therefore the invention is naturally not restricted to the plastic blends disclosed in the examples. Table 4 shows some other blends of polymeric materials that can be applied according to the invention. The invention can naturally also be applied to other blends of polymeric materials.

TABLE 4

| Dispersing phase | The other phase |
|---|---|
| PBT or PA66 | POM, PET, SAN, PC, PMMA, PS, PA6, PA12, polyolefins (PP, COC, PMP), LCP |
| POM or PET | PC, PMMA, PS, PA6, PA12, polyolefins (PP, COC, PMP) |
| SAN or PC | PS, PA6, PA12, polyolefins (PP, COC, PMP) |
| PMMA | PA6, PA12, polyolefins (PP, COC, PMP), LCP |
| PA6 | PA12, polyolefins (PP, COC, PMP) |

POM = polyoxymethylene,
PET = polyethylene terephthalate,
PS = polystyrene,
PA12 = polyamide 12,
PP = polypropylene,
COC = cyclic polyolefin copolymer,
PMP = polymethyl pentene,
LCP = liquid crystalline polymers The basic particle form of the conductive filler can be for example a sphere, cube, flake, fibre or some other particle form known per se. The filler can also comprise two or more different particle forms. A filler particle can be made of entirely conductive material or it can consist of particles coated with a conductive material. The conductive filler can also comprise some other conductive material known per se than nickel, such as silver or graphite. The electrically conductive filler can also be a conductive polymer. Soot and carbon black or other similar conductive fine fillers or additives can also be applied. A blend of two or more conductive fillers can also be utilized. The concentration of the conductive filler can naturally vary in the conductive phase within limits known per se. The blend can comprise more than two phases of polymeric material. For example the phase structure can be stabilized in a manner disclosed in U.S. Pat. No. 4,088,626 by adding a suitable block copolymer or some other similar compatibiliser to the blend. If the electrically conductive filler has lower surface tension than the polymeric materials forming the blend, and the surface tension of the polymeric material forming the continuous three-dimensional phase is at least 2 mN/m lower than the surface tension of the other polymeric materials forming the blend, the filler is dispersed in the continuous phase.

The invention claimed is:

1. A method of preparing an electrically conductive polymer blend, the method comprising steps of selecting at least two polymeric materials that are substantially immiscible together, mixing said polymeric materials into a blend so that at least one of the polymeric materials forms a continuous three-dimensional phase through the entire blend, and mixing an electrically conductive filler into said blend, wherein the electrically conductive filler contains a metal, wherein the electrically conductive filler is dispersed mainly in only one continuous three-dimensional phase, wherein another of said polymeric materials forms a non-dispersing phase which comprises at least one polymeric material selected from the group consisting of polymethylmethacrylate, styrene/acrylonitrile copolymer, polyoxymethylene and liquid crystal polymer, and wherein the surface tension of the polymeric material forming said one continuous three-dimensional phase is at least 2 mN/in lower than the surface tension of the other polymeric materials forming the polymer blend, and the surface tension of the electrically conductive filler is lower than the surface tension of each of the polymeric materials forming the polymer blend.

2. A method according to claim 1, wherein the polymer blend comprises at least two three-dimensional continuous phases.

3. A method according to claim 1, wherein the electrically conductive filler contains nickel.

4. A method according to claim 1, wherein a block copolymer is mixed into the blend to stabilize the structure thereof.

5. An electrically conductive polymer blend, prepared by a method comprising steps of selecting at least two polymeric materials that are substantially immiscible together, mixing said polymeric materials into a blend so that at least one of the polymeric materials forms a continuous three-dimensional phase through the entire blend, and mixing an electrically conductive filler into said blend, wherein the electrically conductive filler contains a metal, wherein the electrically conductive filler is dispersed mainly in only one continuous three-dimensional phase, wherein another of said polymeric materials forms a non-dispersing phase which comprises at least one polymeric material selected from the group consisting of polymethylmethacrylate, styrene/acrylonitrile copolymer, polyoxymethylene and liquid crystal polymer, and wherein the surface tension of the polymeric material forming said one continuous three-dimensional phase is at least 2 mN/in lower than the surface tension of the other polymeric materials forming the polymer blend, and the surface tension of the electrically conductive filler is lower than the surface tension of each of the polymeric materials forming the polymer blend.

* * * * *